US00RE37392B1

(19) United States
(12) Reissued Patent
Baldur

(10) Patent Number: US RE37,392 E
(45) Date of Reissued Patent: Sep. 25, 2001

(54) FIRED CARTRIDGE EXAMINATION METHOD AND IMAGING APPARATUS

(75) Inventor: Roman Baldur, Waterloo (CA)

(73) Assignee: Forensic Technology Wai Inc., Montreal (CA)

(21) Appl. No.: 09/332,647

(22) Filed: Jun. 14, 1999

Related U.S. Patent Documents

Reissue of:
(64) Patent No.: 5,654,801
Issued: Aug. 5, 1997
Appl. No.: 08/368,162
Filed: Jan. 3, 1995

(51) Int. Cl.[7] ..... G01B 11/00
(52) U.S. Cl. ..... 356/388; 356/394; 359/387
(58) Field of Search ..... 356/388, 391, 356/394; 359/373, 374, 385, 387, 391, 392; 348/79

(56) References Cited

U.S. PATENT DOCUMENTS

| | | |
|---|---|---|
| 2,286,430 | 6/1942 | Minton . |
| 3,780,614 | 12/1973 | Maier . |
| 4,157,859 | 6/1979 | Terry . |
| 4,429,960 | 2/1984 | Mocilac et al. . |
| 4,595,265 | 6/1986 | Hodgson et al. . |
| 4,597,648 | 7/1986 | Feldon et al. . |
| 4,688,939 | 8/1987 | Ray et al. . |
| 4,923,066 | 5/1990 | Ophir . |
| 5,172,420 | 12/1992 | Ray et al. . |
| 5,312,393 | 5/1994 | Mastel . |
| 5,379,106 | 1/1995 | Baldur . |
| 5,379,355 | 1/1995 | Allen . |
| 5,390,108 | 2/1995 | Baldur . |

FOREIGN PATENT DOCUMENTS

| | | |
|---|---|---|
| 4130698 | 3/1993 | (DE) . |
| 125187 | 4/1919 | (GB) . |
| 619044 | 3/1949 | (GB) . |
| WO 92/20988 | 11/1992 | (WO) . |

OTHER PUBLICATIONS

Drugfire System Overview—Brochure of FBI Laboratory (undated).
FBI's "Drugfire" Technology Profile by Keith W. Strandberg, Law Enforcement Technology (Apr. 1994).
FBI Drugfire Tests in Baltimore Pick Up Weapons Matches, The Sun, vol. 313, No. 136 (Oct. 21, 1993).
Computer System Links Guns to Crimes Using Fingerprints, Florida/Metro–3, Tampa Tribune, p. 1B (Metro Section) (Jan. 17, 1994).
New FBI Program Targets Firearms by Pierre Thomas, The Washington Post (undated).
Targeting the Repetitive Use of Guns in Gang and Drug Related Shootings, Drugfire, Orange County Sheriff–Coroner Department, vol. 1 (Jan. 11, 1994).

(List continued on next page.)

*Primary Examiner*—F. L. Evans
(74) *Attorney, Agent, or Firm*—Cantor Colburn LLP

(57) ABSTRACT

The apparatus has a fired cartridge mounting device for holding the cartridge substantially aligned with a longitudinal axis with a primer surface of the cartridge substantially perpendicular to the axis, a cartridge microscope mounted with its optical axis substantially parallel to the longitudinal axis, a focusing mechanism for focusing the microscope to image a breech face impression on the primer surface and a firing pin impression surface in the primer surface, and an axisymmetric light source mounted to project axially symmetric light onto the breech face impression and the firing pin impression surface about the longitudinal axis. Images of the breech face and the firing pin impressions can be used for comparative analysis independently of an angular orientation of the cartridge held by the mounting device. During this analysis, a first image from a test cartridge and a second image from a computer data bank are rotated relative to one another, and a maximum correlation value for the rotated first and second images is obtained.

40 Claims, 3 Drawing Sheets

OTHER PUBLICATIONS

Ballistics Boon for PG by Brian Reilly, Maryland News (May 6, 1994).
The FBI Drugfire Program Brochure (undated).
Federal Bureau of Investigation Drugfire, Brochure of FBI Laboratory (undated).
Firearms Investigation, Identification and Evidence by Hatcher Jury & Weller, BATF Lab, San Francisco Lab Center, pp. 382–391 (undated).
Byte the Bullet, Montreal Gazette, pp. 3–4 (Jan. 30, 1995).
Leica Brochure, Leica Microscopy and Scientific Instruments Group, DAS Macroscope Leica DM–C, (undated).
Volpi—Fiber Optic Cold Light Illumination Brochure.
Fiber Optic Ring Light Guide Sheet by American Optical (1980).
List Prices of Stereo Zoom Microscopes by Bausch & Lomb (1977).
The Silverman Illuminator by Spencer Lens (1931).
Firearms Identification vol. 1 by J. Howard Mathews (1962).
Volpi Product Specification in German (1993).
Leeds Custom Accessories Data Sheet re Ringlight.
Leitz Aristophot Photographic Equipment Instruction Book (1954).
Leica DM–C Comparison Macroscope by Sergeant Gerard Dutton, ATFE Journal, vol. 28, No. 1 (1996).
Leitz article re Comparison Microscope for Criminological Purposes with Photographic Mechanism in German w/attached translation (Jul. 1936) (MS6435–6492).
Volpi Manufacturing USA—Fiber Optic Cold Light Illumination (1996).
Volpi Manufacturing—Suggested List Prices—Cold Light Illumination (Jun. 1, 1998).
Volpi—Products for Police and Forensic Science—Video Comparsion Microscope (Jul. 1, 1997).
Volpi—Products for Police and Forensic Science—Document Examination (1993).
Volpi—Products for Police and Forensic Science—Footwear Impressions (1993).
Volpi—Products for Police and Forensic Science—Fingerprints.
Leitz Ultropak Catalog (Oct. 1939).
Leitz Price List for Pamphlet No. 7113 "Ultropak" Micro–Equipment (Dec. 27, 1933).
Leitz "Ultropak" Micro–Equipment Catalog (Dec. 1931).
The Conclusive Link is Forensic Ballastics by Spencer Lens Co. (Jun. 1936).
Nikon Measurescope MM–11/11B Brochure (Apr. 1989).
Nikon Measurescope MM–11/11C Brochure (Apr. 1994).
The Identification of Firearms and Forensic Ballistics by Major Gerald Burrard, pp. 1–106, 107–207 (1934).
Textbook of Firearms Investigation, Identification and Evidence by Major Julian S. Hatcher (1935).
Instruction Manual—SZ3060, SZ4045/SZ4060, SZ6045/SZ1145 Zoom Stereo Microscope.
Olympus SZ Series Zoom Stereo Microscope Brochure.
Automated Landmark Identification System by Tsuneo Uchiyama, AFTE Journal, vol. 25, No. 3 (Jul. 1993) (MSI674–681).
Optical Imaging Techniques for Ballistics Specimens to Identify Firearms by C.L. Smith and J.M. Cross, IEEE (1995) (MSI682–696).
Bulletproof User Guide, Data Acquisition Station (DAS), Version 1.0 (Oct. 1993) (FTI–8650–8777).
Bender Associate, Inc., Invoice No. 18602 for the purchase of a stereo microscope (Jan. 22, 1993).
Leeds Precision Instruments, Inc., Invoice No. 89242 for the purchase of a stereo microscope (Nov. 17, 1992).
The Silverman Illuminator Price List.
Fluorescent Ring Illuminator Instruction Manual (1979) (MSI6010–6011).

20
14
24
15
12
17
16
10
21
18
22
36
30

FIRED CARTRIDGE EXAMINATION METHOD AND IMAGING APPARATUS

Matter enclosed in heavy brackets [ ] appears in the original patent but forms no part of this reissue specification; matter printed in italics indicates the additions made by reissue.

FIELD OF THE INVENTION

The present invention relates to a fired cartridge examination imaging apparatus for use during forensic analysis of spent firearm cartridges. The invention relates further to a method of comparing fired cartridges from firearms.

BACKGROUND OF THE INVENTION

Fired bullets and bullet cartridges are left with markings from the firearm from which they come. These markings result from forced contact with metal parts in the firearm and are unique to the firearm since the metal parts have engraved surfaces which are themselves unique due to the machining process during manufacturing. Using microscopic examination of fired bullets and cartridges (casings or shells), firearms experts have traditionally been able to compare markings to identify whether fired bullets or spent cartridges originate from a given firearm.

The process of bullet examination has been successfully automated using apparatus as set out in PCT/CA92/00216 (published as WO 92/20988). Bullet illumination is described in U.S. Pat. No. 5,379,355.

In manual comparison of fired cartridges, the cartridge under investigation is placed under a microscope along with a test cartridge from a known firearm. The impression of the breech face on the primer and the firing pin impression in the primer surface have markings that are compared. Conventionally, side illumination is used which provides an image dependent on the direction of the illumination. To compare the markings on cartridge bases, the angle of illumination must be the same. For this purpose, illumination direction protocols are used. When two cartridges originate from the same firearm, the markings will have the same characteristics. Since the appearance of the primer breech face impression and firing pin impression is different using different angles of illumination, the firearms examiner will usually confirm a match using illumination from more than one angle.

The need to use an illumination direction protocol and possibly additional images of each cartridge using different illumination angles is a problem for automating the process of imaging and analysis.

SUMMARY OF THE INVENTION

It is an object of the present invention to simplify and therefore to improve the automated process of fired cartridge imaging and analysis. In brief, the object of the present invention is achieved by using axially symmetric illumination for obtaining images of the fired cartridges. These images can be rotated with respect to one another and compared to obtain a correlation factor.

It is a further object of the present invention to provide such an apparatus which can switch between a magnification suitable to view the firing pin impression and a magnification suitable to view the breech face impression on the primer surface.

According to the invention there is provided a fired cartridge imaging apparatus comprising a fired cartridge mounting device for holding the cartridge substantially aligned with a longitudinal axis, a primer surface of the cartridge being substantially perpendicular to the axis, a cartridge microscope having an optical axis and mounted with the optical axis substantially parallel to the longitudinal axis, focusing means for focusing the microscope to image a breech face impression on the primer surface and a firing pin impression surface in the primer surface, and an axisymmetric light source mounted to project axially symmetric light onto the breech face impression and the firing pin impression surface about the longitudinal axis. In this way, images of the breech face and the firing pin impressions can be used for comparative analysis independently of an angular orientation of the cartridge held by the mounting device.

According to the invention, there is also provided a method of comparing fired cartridges from firearms comprising the steps of:

illuminating a base of a first fired cartridge from a first firearm using axially symmetric light;

obtaining using a microscope a first image of a breech face impression on a primer of the first base with the breech face impression in focus;

illuminating a base of a second fired cartridge from a second firearm using axially symmetric light;

obtaining using a microscope a second image of a breech face impression on a primer of the second base with the breech face impression in focus;

rotating the first and the second images relative to one another; and obtaining a maximum correlation value for the rotated first and second images.

The method according to the invention preferably further comprises steps of: adjusting a focus and magnification of the microscope to obtain a first image of a firing pin impression on the first primer with the firing pin impression in focus; adjusting a focus and magnification of the microscope to obtain a second image of a firing pin impression on the second primer with the firing pin impression in focus; rotating the first and the second firing pin images relative to one another; and obtaining a maximum correlation value for the rotated first and second firing pin images. Of course, the invention also contemplates obtaining a combined correlation value based on the maximum correlation value for the breech face impression images and the maximum correlation value for the firing pin impression images, as well as a relative rotation orientation of the first and second breech face impression images with respect to the first and second firing pin impression images.

Preferably, the illumination is automatically adjusted by analyzing each image to determine if the illumination is right. In the case that it is not right, an adjustment is made and the image is taken over again.

BRIEF DESCRIPTION OF THE DRAWINGS

The invention will be better understood by way of the following detailed description of a preferred embodiment with reference to the appended drawings, in which.

DETAILED DESCRIPTION OF THE PREFERRED EMBODIMENT

Figure 1:
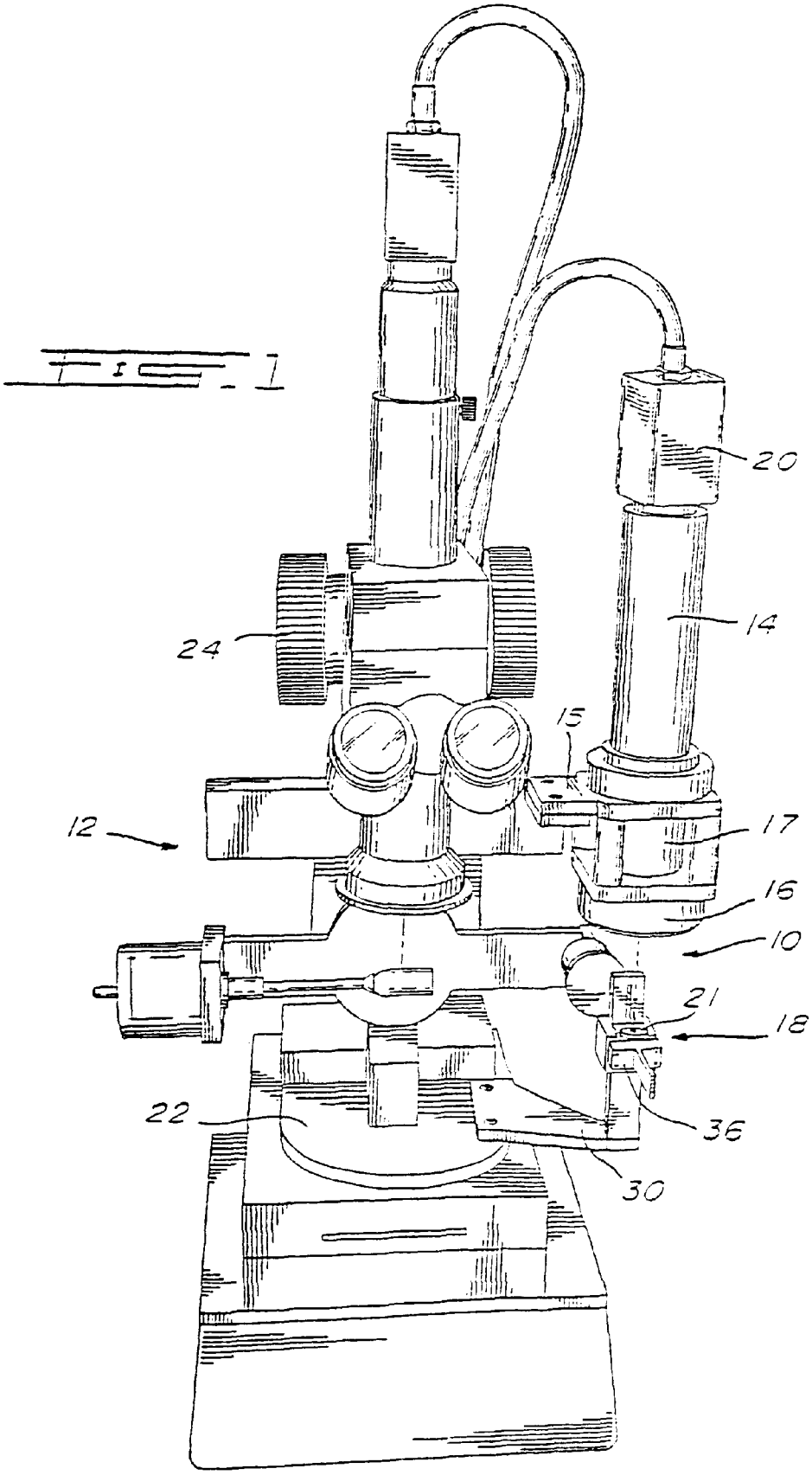
FIG. 1 is a perspective view of the apparatus according to the preferred embodiment except for the image processing computer showing the cartridge mounting device attached to a main microscope stage and the cartridge microscope and camera mounted to the optics of the main microscope.

As shown in FIG. 1, the preferred embodiment has the cartridge microscope and camera optics 10 mounted to complementary (main) microscope optics 12 for analyzing fired bullets. The cartridge 21 is viewed using a microscope 14 and images are taken using a CCD (charge coupled device) camera 20. Axially symmetric light is provided by a fiber optic ring light 16. The cartridge 21 is securely held by a mounting device 18, which itself is adjustably mounted on an arm 30 attached to the stage 22 of the main microscope 12.

The microscope 14 is mounted by arm 15 to the microscope optics of the main microscope 12 so that the focusing system 24 (fine vertical height adjustment) can be used. The stage 22 is moveable in the so-called x-y horizontal plane, although such adjustment is not normally used from one cartridge to the next. The focus and x-y movements are computer controlled, as is known in the art.

Figures 2, 3:
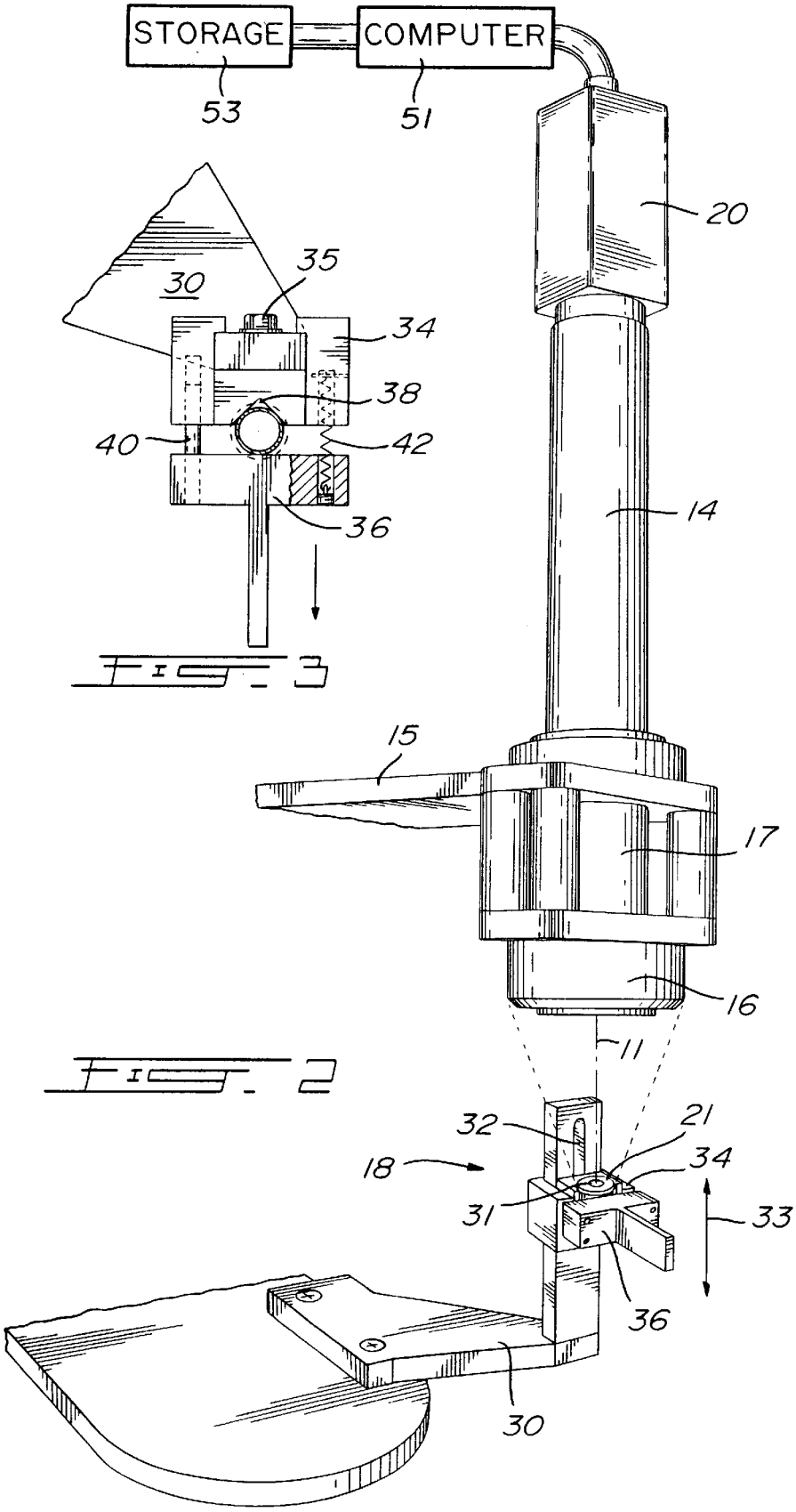
FIG. 2 is a detailed view showing the cartridge microscope and mounting device of FIG. 1.
FIG. 3 is a detailed plan view of the cartridge mounting device according to the preferred embodiment.

With reference to FIGS. 2 and 3, the mounting device 18 will be described in greater detail. The cartridge 21 is held in a V-shaped groove 38 between two plates 34 and 36. Plate 34 is connected to arm 15, and plate 36 is slideably connected to plate 34 by pins 40 and springs 42. A handle may be provided as shown. The device 18 is adjustably connected to arm 30 and can be moved long direction 33 as bolts 35 are repositioned in slot 32. The vertical adjustment along direction 33 is a rough adjustment, with finer adjustments being achieved by focusing system 24 (FIG. 1). The horizontal edge member (not shown in the figures for clarity) is mounted to plate 34 and extends over the top of the cartridge 21 to act as an abutment. The edge member fixes the vertical height of the cartridge 21 with respect to the mounting device 18. To insert the cartridge 21 into the device 18, the plate 36 is pulled away from plate 34, and the cartridge 21 is placed from below into the groove 38 until reaching the horizontal edge member. The plate 36 is then released and the cartridge is held securely in place.

Figure 4:
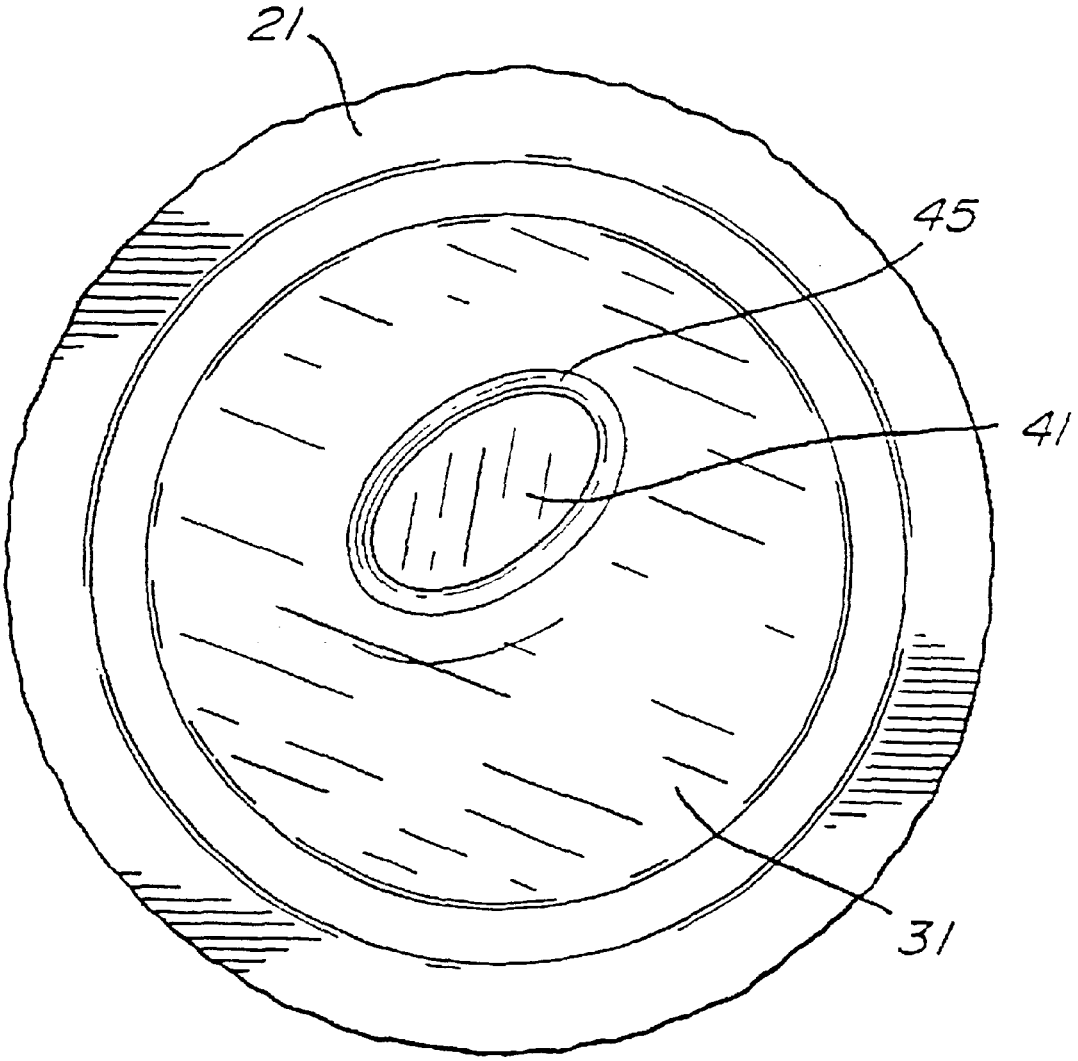
FIG. 4 is a schematic illustration of a primer from a fired cartridge.

A zoom lens 17 is provided to adjust the magnification of the image seen by microscope 14. The useful images gathered using camera 20 are from the primer 31. The primer is the malleable or mobile central part of the rear of the cartridge 21, and is the part struck by the firing pin of the firearm. As shown in FIG. 4, the firing pin itself leaves its mark 41 in the primer 31, and this is one useful image. The primer also contains markings from the breech face of the firearm which are imprinted during firing. The breech face impressions are another useful image. The contour 45 of the firing pin (which can be obtained from either of the previous two images) is another piece of useful information.

When a cartridge is to be tested using the present invention, it is placed in the mounting device 18 as set out above. The image from camera 20 is usually seen on a monitor. Using the zoom lens 17, the magnification is adjusted to view the primer. The zoom adjustment could be manual, but is preferably automatic. The breech face impression surface of the primer 31 is place in focus using the automatic focusing system 24, and an image of the breech face impressions is obtained and stored in the computer *51 in FIG. 2*. An adjustment of the stage 22 may be necessary to bring the primer near the center of the optic axis 11, but this is not necessary when the system was last used for cartridge imaging. An adjustment of the illumination may also be required. The image is analyzed in the computer for contrast. If insufficient contrast is present, or if the image is too bright or too dim, the level of illumination in ring light 16 is adjusted. Next, the magnification is increased to bring the firing pin impression into view. The image is focused as before, and the firing pin impression image is stored. Again the image is checked for proper illumination, and if necessary, the illumination is adjusted and the image is taken over.

Two cartridges will never produce exactly the same image, even if they are from the same firearm. In the analysis of a cartridge, the object is to locate which cartridge or cartridges resemble the test cartridge the most. A numerical correlation factor is computed for each set of images (breech face and firing pin impression images) with respect to the images for the test cartridge 21. The closest images are then compared in greater detail to determine whether the test cartridge was fired from the same weapon as the cartridge whose images are stored in the computer's memory *53 in FIG. 2* (disk or tape storage).

The process of correlation involves rotation of the images to obtain the correlation value from the relative rotational position which gives the best correlation. Clearly, this relative rotational position should be approximately the same for the breech face impressions (on surface 31 in FIG. 4) as for the firing pin impressions (on surface 41 in FIG. 4), at least with firearms in which the firing pin is not free to rotate. Also, the relative rotational position of the contour 45 of the firing pin (round, oval, triangular, and irregular shapes similar thereto) must correspond with the firing pin impression orientation. The computer *51 in FIG. 2* may recognize the shape of contour 45 using line or object recognition techniques known in the art. Preferably, the contour shape is extracted when the magnification is larger, for greater precision. During correlation, the breech face and firing pin markings and contour shape are analyzed. The markings may comprise a series of broken lines as shown in FIG. 4. The breech face of the firearm may have markings other than milling lines which are imprinted onto the primer 31. The same is true for the firing pin impressions. Thus, the impressions may include characteristics which are not segments of ordered lines. The correlation software takes into account width, depth, length or other dimensional characteristics of the markings, as well as any order in the markings, and calculates a numerical correlation value between the test images and each of the stored images. The correlation value for a given stored image is taken as the one from the best relative rotational orientation between the test and stored images. As can be appreciated, the axially symmetric light gives a single image which contains information about all surface markings. When direct side lighting is used, better contrast may be obtained, but some information is lost.

The invention allows a single cartridge to be compared with hundreds or thousands of other cartridges using the computer and its cartridge image database in a relatively short time. *It will be appreciated that the invention allows for the cartridge image database to be built from individually acquired images stored in the computer.* The result is a small number of closest correlated cartridges which can quickly be analyzed further to determine whether a "match" has been found. The further analysis may be done by computer analysis, however, the final judgment is preferably carried out by a ballistics or firearms expert manually using special equipment for comparing [for comparing] the microscopic images.

What is claimed is:

1. A fired cartridge examination imaging apparatus comprising:

a fired cartridge mounting device for holding said cartridge substantially aligned with a longitudinal axis, a primer surface of said cartridge being substantially perpendicular to said axis;

a cartridge microscope having an optical axis and mounted with said optical axis substantially parallel to said longitudinal axis;

focusing means for focusing said microscope to image a breech face impression on said primer surface and a firing pin impression surface in said primer surface; and a ring lamp mounted to project axially symmetric light onto said breech face impression and said firing pin impression surface about said longitudinal axis, whereby images of said breech face and said firing pin impressions can be used for comparative analysis independently of an angular orientation of said cartridge held by said mounting device.

2. The apparatus as claimed in claim 1, wherein said microscope has a magnification adjustable between a first setting suitable to view said breech face impression and a second setting suitable to view said firing pin impression.

3. The apparatus as claimed in claim 2, further comprising means for automatically adjusting said focusing means to place into focus said firing pin impression and said breech face impression.

4. A fired cartridge examination imaging apparatus comprising:

a fired cartridge mounting device for holding said cartridge substantially aligned with a longitudinal axis, a primer surface of said cartridge being substantially perpendicular to said axis;

a cartridge microscope having an optical axis and mounted with said optical axis substantially parallel to said longitudinal axis, said cartridge microscope being attached to a complimentary microscope, said cartridge mounting device being attached to a stage of said complimentary microscope;

focusing means being operated for both said cartridge microscope and said complimentary microscope for focusing said cartridge microscope to image a breech face impression on said primer surface and a firing pin impression surface in said primer surface; and an axisymmetric light source mounted to project axially symmetric light onto said breech face impression and said firing pin impression surface about said longitudinal axis, whereby images of said breech face and said firing pin impressions can be used for comparative analysis independently of an angular orientation of said cartridge held by said mounting device.

5. The apparatus as claimed in claim 4, wherein said light source is a ring lamp.

6. A fired cartridge examination imaging apparatus comprising:

a fired cartridge mounting device for holding said cartridge substantially aligned with a longitudinal axis, a primer surface of said cartridge being substantially perpendicular to said axis wherein said mounting device comprise a pair of opposed vertical plates resiliently biased toward one another, one of said plates being provided with a V-shaped groove having a vertical lengthwise extent parallel to said longitudinal axis, one of said vertical plates including a horizontal edge member mounted to a top surface of said one of said vertical plates for engaging an upper edge of a base of said cartridge, said cartridge being held in a fixed vertical position with said base abutting said horizontal edge member, said cartridge being received by said groove and held between said plates;

a cartridge microscope having an optical axis and mounted with said optical axis substantially parallel to said longitudinal axis, said cartridge microscope being attached to a complimentary microscope, said cartridge mounting device being attached to a stage of said complimentary microscope;

focusing means being operated for both said cartridge microscope and said complimentary microscope for focusing said cartridge microscope to image a breech face impression on said primer surface and a firing pin impression surface in said primer surface; and an axisymmetric light source mounted to project axially symmetric light onto said breech face impression and said firing pin impression surface about said longitudinal axis, whereby images of said breech face and said firing pin impressions can be used for comparative analysis independently of an angular orientation of said cartridge held by said mounting device.

7. A method of comparing fired cartridges from firearms comprising the steps of:

illuminating a base of a first fired cartridge from a first firearm using axially symmetric light;

obtaining using a microscope a first image of a breech face impression on a primer of said first base with said breech face impression in focus;

illuminating a base of a second fired cartridge from a second firearm using axially symmetric light;

obtaining using a microscope a second image of a breech face impression on a primer of said second base with said breech face impression in focus;

rotating said first and said second images relative to one another; and obtaining a maximum correlation value for said rotated first and second images.

8. The method as claimed in claim 7, further comprising steps of:

adjusting a focus and magnification of said microscope to obtain a first image of a firing pin impression on said first primer with said firing pin impression in focus;

adjusting a focus and magnification of said microscope to obtain a second image of a firing pin impression on said second primer with said firing pin impression in focus;

rotating said first and said second firing pin images relative to one another; and obtaining a maximum correlation value for said rotated first and second firing pin images.

9. The method as claimed in claim 8, further comprising steps of:

obtaining a first and second firing pin contour of said firing pin impression from said first and second cartridge primers, respectively;

rotating said first and said second firing pin contours relative to one another; and obtaining a maximum correlation value for said rotated first and second firing pin contours.

10. The method as claimed in claim 8, further comprising a step of obtaining a combined correlation value based on said maximum correlation value for said breech face impression images and said maximum correlation value for said first and second firing pin impression images, as well as a relative rotation orientation of said first and second breech face impression images with respect to said first and second firing pin impression images.

11. The method as claimed in claim 9, further comprising a step of obtaining a combined correlation value based on said maximum correlation value for said breech face impression images, said maximum correlation value for said first and second firing pin impression images, and said maximum correlation value for said first and second firing pin impression contours, as well as a relative rotation orientation of said first and second contours, said first and second breech face impression images, and said first and second firing pin impression images with respect to one another.

12. The method as claimed in claim 7, further comprising steps of:

analyzing said first image to determine whether sufficient or excessive illumination is present; and if necessary adjusting a level of said axially symmetric light before repeating said step of obtaining said first image.

13. The method as claimed in claim 8, further comprising steps of:

analyzing said first image of said firing pin impression to determine whether sufficient or excessive illumination is present; and if necessary adjusting a level of said axially symmetric light before repeating said step of obtaining said first image of said firing pin impression.

14. The method as claimed in claim 9, further comprising steps of:

analyzing said first image of said breech face impression to determine whether sufficient or excessive illumination is present; and if necessary adjusting a level of said axially symmetric light before repeating said step of obtaining said first image of said breech face impression.

15. A method of comparing fired cartridges from firearms comprising the steps of:

illuminating a base of a first fired cartridge from a first firearm using axially symmetric light;

obtaining using a microscope a first image of a firing pin impression on a primer of said first base with said firing pin impression in focus;

illuminating a base of a second fired cartridge from a second firearm using axially symmetric light;

obtaining using a microscope a second image of a firing pin impression on a primer of said second base with said firing pin impression in focus;

rotating said first and said second images relative to one another: and obtaining a maximum correlation value for said rotated first and second images.

*16. A fired cartridge examination imaging apparatus comprising:*

*a fired cartridge mounting device for holding said cartridge substantially aligned with a longitudinal axis,*

*a primer surface of said cartridge being substantially perpendicular to said axis;*

*a cartridge microscope having an optical axis and mounted with said optical axis substantially parallel to said longitudinal axis;*

*a focus adjustment mechanism for focusing said microscope on a breech face impression on said primer surface and/or a firing pin impression on said primer surface;*

*a light mounted to project axially symmetric light onto said breech face impression and/or said firing pin impression about said longitudinal axis, a camera operably connected to said microscope for obtaining an image of said breech face impression and/or said firing pin impression; and*

*a computer for storing said image of said breech face impression and/or said firing pin impression, whereby said images of said breech face and/or said firing pin impressions can be used for comparative analysis independently of an angular orientation of said cartridge held by said mounting device.*

*17. The apparatus of claim 16, wherein said computer is capable of storing multiple images of breech face impressions and/or firing pin impressions and comparing said stored images for likenesses.*

*18. The apparatus of claim 17, wherein said light comprises a ring light.*

*19. The apparatus of claim 16, wherein said microscope has a magnification adjustable between a first setting suitable to view said breech face impression and a second setting suitable to view said firing pin impression.*

*20. The apparatus of claim 18, wherein said microscope has a magnification adjustable between a first setting suitable to view said breech face impression and a second setting suitable to view said firing pin impression.*

*21. A method of comparing fired cartridges from firearms comprising the steps of:*

*illuminating a base of a first fired cartridge using axially symmetric light;*

*obtaining using a microscope a first image of a firing pin impression on a primer of said base of said first fired cartridge with said firing pin impression in focus;*

*illuminating a base of a second fired cartridge using axially symmetric light;*

*obtaining using a microscope a second image of a firing pin impression on a primer of said base of said second fired cartridge with said firing pin impression in focus;*

*storing said first and second images in a computer; and*

*comparing said first and second stored images for likenesses.*

*22. The method of claim 21, wherein said comparing includes correlating likenesses of said images in a computer.*

*23. The method of claim 22, wherein said illuminating comprises illuminating said bases with axially symmetric light from a ring light.*

*24. The method of claim 23, wherein said correlating comprises:*

*rotating said first and second images of said firing pin impressions relative to one another; and*

*obtaining a maximum correlation value for said rotated first and second images of said firing pin impressions.*

*25. The method of claim 21, further comprising:*

*obtaining using a microscope a first image of a breech face impression on said primer of said base of said first fired cartridge with said breech face impression in focus;*

*obtaining using a microscope a second image of a breech face impression on said primer of said base of said second fired cartridge with said breech face impression in focus;*

*storing said first image of a breech face impression and said second image of a breech face impression in a computer; and*

*comparing said first image of a breech face impression and said second image of a breech face impression for likenesses.*

*26. The method of claim 25, wherein said comparing includes correlating likenesses of said images using a computer.*

*27. The method of claim 26, wherein said illuminating comprises illuminating said bases with axially symmetric light from a ring light.*

*28. The method of claim 27, wherein said correlation comprises:*

*rotating said first and second images of said breech face impressions relative to one another; and*

*obtaining a maximum correlation value for said rotated images.*

*29. A method of comparing fired cartridges from firearms comprising the steps of:*

*illuminating a base of a first fired cartridge using axially symmetric light;*

*obtaining using a microscope a first image of a breech face impression on a primer of said base of said first fired cartridge with said breech face impression in focus;*

*illuminating a base of a second fired cartridge using axially symmetric light;*

*obtaining using a microscope a second image of a breech face impression on a primer of said base of said second fired cartridge with said breech face impression in focus;*

*storing said first and second images in a computer; and*

*comparing said first and second stored images for likenesses.*

*30. The method of claim 29, wherein said comparing includes correlating likenesses of said images using a computer.*

*31. The method of claim 30, wherein said illuminating comprises illuminating said bases with axially symmetric light from a ring light.*

*32. The method of claim 31, wherein said comparing comprises:*

*rotating said first and second images of breech face impressions relative to one another; and*

*obtaining a maximum correlation value for said rotated first and second images of breech face impressions.*

*33. The method of claim 29, further comprising:*

*obtaining using a microscope a first image of a firing pin impression on said primer of said base of said first fired cartridge with said firing pin impression in focus;*

*obtaining using a microscope a second image of a firing pin impression on said primer of said base of said second fired cartridge with said firing pin impression in focus;*

*storing said first image of a firing pin impression and said second image of a firing pin impression images in a computer; and*

*comparing said first image of a firing pin impression and said second image of a firing pin impression for likenesses.*

*34. The method of claim 33, wherein said comparing includes correlating likenesses of said first image of a firing pin impression and said second image of a firing pin impression using a computer.*

*35. The method of claim 34, wherein said illuminating comprises illuminating said bases with axially symmetric light from a ring light.*

*36. The method of claim 35, wherein said correlation comprises:*

*rotating said first and second images of firing pin impressions relative to one another; and*

*obtaining a maximum correlation value for said rotated first and second images of firing pin impressions.*

*37. In a method of comparing fired cartridges, the method of building a database of images of fired cartridges comprising:*

*a. positioning a fired cartridge for imaging;*

*b. illuminating with axially symmetric lighting the cartridge for imaging;*

*c. obtaining an image of the cartridge; and*

*d. storing the image acquired of the cartridge in a computer cartridge image database.*

*38. The method of building a database of claim 37 wherein the steps a, b, c and d are repeated to build said database containing data relating to a large number of cartridges.*

*39. The method of building a database of claim 37 wherein the image acquired is the image of a breech face impression of the cartridge case.*

*40. The method of building a database of claim 37 wherein the image acquired is the image of a firing pin impression of the cartridge case.*

* * * * *